(12) United States Patent
Koul

(10) Patent No.: US 8,116,990 B2
(45) Date of Patent: Feb. 14, 2012

(54) METHOD AND SYSTEM FOR REAL-TIME PROGNOSIS ANALYSIS AND USAGE BASED RESIDUAL LIFE ASSESSMENT OF TURBINE ENGINE COMPONENTS AND DISPLAY

(76) Inventor: Ashok Koul, Ottawa (CA)

( * ) Notice: Subject to any disclaimer, the term of this patent is extended or adjusted under 35 U.S.C. 154(b) by 1152 days.

(21) Appl. No.: 12/930,423

(22) Filed: Oct. 19, 2007

(65) Prior Publication Data

US 2011/0137575 A1 Jun. 9, 2011

(51) Int. Cl.
*G01B 3/52* (2006.01)
(52) U.S. Cl. .............................. 702/34; 324/548; 378/58
(58) Field of Classification Search .................... 702/34, 702/40, 42, 130, 182, 184; 73/112.01, 112.06, 73/715, 762, 799; 324/548; 374/144; 378/58; 340/679; 701/29, 100
See application file for complete search history.

(56) References Cited

U.S. PATENT DOCUMENTS

| | | | |
|---|---|---|---|
| 4,215,412 A | 7/1980 | Bernier et al. | |
| 5,080,496 A | 1/1992 | Keim et al. | |
| 5,210,704 A | 5/1993 | Husseiny | |
| 5,455,777 A * | 10/1995 | Fujiyama et al. | ............... 702/34 |
| 5,689,066 A | 11/1997 | Stevenson | |
| 6,343,251 B1 | 1/2002 | Herron et al. | |
| 6,449,565 B1 | 9/2002 | Budrow et al. | |
| 6,539,783 B1 | 4/2003 | Adibhatia | |
| 6,756,908 B2 | 6/2004 | Gass et al. | |
| 6,845,306 B2 | 1/2005 | Henry et al. | |
| 6,871,160 B2 | 3/2005 | Jaw | |
| 7,197,430 B2 | 3/2007 | Jacques et al. | |
| 7,889,840 B2 * | 2/2011 | Vasudevan et al. | ............. 378/58 |
| 7,977,952 B2 * | 7/2011 | Krutz et al. | .................. 324/548 |

FOREIGN PATENT DOCUMENTS

CA 2516958 2/2006
* cited by examiner

*Primary Examiner* — John H Le

(57) ABSTRACT

A method and system for performing continuous (real-time) physics based prognostics analysis as a function of actual engine usage and changing operating environment. A rule-based mission profile analysis is conducted to determine the mission variability which yields variability in the type of thermal-mechanical loads that an engine is subjected to during use. This is followed by combustor modeling to predict combustion liner temperatures and combustion nozzle plane temperature distributions as a function of engine usage which is followed by off-design engine modeling to determine the pitch-line temperatures in hot gas path components and thermodynamic modeling to compute the component temperature profiles of the components for different stages of the turbine. This is automatically followed by finite element (FE) based non-linear stress-strain analysis using an real-time FE solver and physics based damage accumulation, life consumption and residual life prediction analyses using microstructural modeling based damage and fracture analysis techniques.

20 Claims, 19 Drawing Sheets

Time

METHOD AND SYSTEM FOR REAL-TIME PROGNOSIS ANALYSIS AND USAGE BASED RESIDUAL LIFE ASSESSMENT OF TURBINE ENGINE COMPONENTS AND DISPLAY

TECHNICAL FIELD

The present invention relates to real-time monitoring of turbine engines under off-design engine operating conditions and performing physics based prognostics analysis of multiple engine components for life consumption and residual life prediction before the development of actual material damage and discernable faults in the said components in real time. More specifically, the invention relates to a system and methods for real time monitoring and performing modified rain-flow and rule based mission profile analysis for assessing variability in damage accumulation modes and mechanisms and fracture mechanisms that are operative as a function of real time engine usage, running physics based combustor modeling for obtaining combustor liner and combustor nozzle temperature profiles, performing thermodynamic analysis for obtaining gas path temperature profiles, performing heat transfer analysis for obtaining component temperature profiles, performing material physics based non-linear finite element analysis for obtaining component level thermal-mechanical loads profiles and performing material damage and fracture analyses of multiple engine components as a function of actual engine usage including the display of the variability of fracture critical locations, life consumption, safe inspection interval and residual life using data collected in real-time by traditional monitoring methods.

List of U.S. and Canadian Patent Documents on the Subject

| | | |
|---|---|---|
| U.S. Pat. No. 4,215,412 | July 1980 | Bernier et al. |
| U.S. Pat. No. 5,080,496 | January 1992 | Keim et al. |
| U.S. Pat. No. 5,689,066 | November 1997 | Stevenson |
| U.S. Pat. No. 6,343,251 | January 2002 | Herron et al. |
| U.S. Pat. No. 6,449,565 | September 2002 | Budrow et al. |
| U.S. Pat. No. 6,539,783 | April 2003 | Adibhatla |
| U.S. Pat. No. 6,756,908 | June 2004 | Gass et al. |
| U.S. Pat. No. 6,845,306 | January 2005 | Henry et al. |
| U.S. Pat. No. 6,871,160 | March 2005 | Jaw |
| U.S. Pat. No. 7,197,430 | March 2007 | Jacques et al. |
| CA 2516958 | February 2006 | Volponi and Wood |
| U.S. Pat. No. 5,210,704 | May 1993 | Husseiny |

U.S. Pat. No. 4,215,412 by Bernier et al discloses the real time performance monitoring system for gas turbines but the performance data collected is not further processed to allow computation of component lives.

U.S. Pat. No. 5,080,496 by Keim et al discloses the sensor apparatus for monitoring gas path temperatures and engine rotational speeds and the sensor data collected is not further processed to allow computation of component lives.

U.S. Pat. No. 5,689,066 by Stevenson discloses the method and apparatus for analyzing gas turbine pneumatic fuel system using air pressure data to detect the development of damage or faults in the fuel control system. The system does not deal with the main body of the turbine.

U.S. Pat. No. 6,343,251 by Herron et al discloses the method and system for predicting life consumption of a gas turbine simply by keeping a record of engine operation and using a simple calculator to predict residual life by subtracting usage life from a predetermined life for the engine. The system does not actually compute component level temperatures, stresses etc. or possess any life prediction algorithms to predict real time residual life.

U.S. Pat. No. 6,449,565 by Budrow et al discloses a sensor based but real time stress-strain data collection system to determine stress pairs to compute usage based fatigue life. The proposed system is location specific on a structural membrane and its application in a gas turbine operating environment would be limited if not impossible.

U.S. Pat. No. 6,539,783 by Adibhatla discloses a turbine performance monitoring and estimation system for fault detection rather than life prediction. Most performance-based systems are only able to pick up compressor fowling in real life and the diagnostic capability of such systems is extremely limited.

U.S. Pat. No. 6,756,908 by Gass et al discloses an electronic sensor based crack detection system in a specific fracture critical location. The system is a location specific diagnostic system rather than a prognostics system proposed in our patent.

U.S. Pat. No. 6,845,306 by Henry et al discloses a performance monitoring and trending system and comparing the trends with historical data to detect component level faults. Again, most performance-based diagnostic systems are only able to pick up compressor fowling in real life and the diagnostic capability of such systems is extremely limited.

U.S. Pat. No. 6,871,160 by Jaw discloses the architecture of a machine health management system that uses sensor data, predetermined life, predicted failure modes information and planning and scheduling information to make decisions about condition based life cycle management of the machine. Predetermined life is not the same thing as the usage based life prediction and a user or an original equipment manufacturer almost have to loose half of the turbine fleet to realistically populate the failure modes data bases because physics based prognosis is not used to determine the failure modes.

U.S. Pat. No. 7,197,430 by Jacques et al. discloses a sensor information based engine parts life usage system (EPLTS) to quantify cyclic and/or steady state usage but the system only uses predetermined component lives to make decisions about the remaining life of the components and the process does not involve physics based prognosis to compute life usage or residual life as a function of engine operation.

U.S. Pat. No. 5,210,704 by Husseiny discloses a sensor based monitoring system where the raw sensor signal that is representative of the structural performance of the system is massaged using various signal trending and pattern recognition techniques to assess the deviation from the normal operation in order to make a decision about the development of a structural fault in a specific component of the helicopter rotating system. the current invention is not a sensor based monitoring system but a purely physics based prognostics system that uses the principles of engineering physics at every stage of analysis in a specific sequence in real time to translate the engine operational information, such as engine rotating speed and outside operational temperature, into thermal-mechanical loading information. Because of this physics based architecture of the current invention, it is capable of advising a user about the probability of a fault developing in a specific component within the system or at a specific location of a given component long before an actual fault is formed.

BACKGROUND OF THE INVENTION

Surface damage occurs in turbine parts as a result of erosion, corrosion, fretting, wear or impact by foreign objects and particulates. This loss of surface integrity and component geometry leads to losses in aerodynamic and thermal efficiency, and reduced power output for a given fuel burn. More importantly, parts suffer internal structural damage, which leads to metallurgical deterioration and ultimately component failure, engine shutdown and unscheduled maintenance.

The cyclic nature of power demands and the high frequency pressure fluctuations due to turbulence in gas flows leads to internal microstructural damage in the form of fatigue, cold creep, stress corrosion, low cycle fatigue (LCF), high cycle fatigue (HCF) and corrosion fatigue in rotating as well as stationary parts such as compressor blades, vanes and discs, turbine discs, shafts and spacers. The components in the hot gas stream, such as turbine discs and blades, guide vanes, seals, and combustor casings and linings, suffer from cyclic fluctuations in temperature as well as inertia loads, both of which also cause internal microstructural damage due to high temperature creep, thermal fatigue, thermal-mechanical fatigue (TMF), creep-fatigue environment interactions and/or high temperature low cycle fatigue (HTLCF), and various combinations of these mechanisms. The net result of the combined action of all of these damage modes is that many of these high cost components have finite lives.

The challenge to manufacturers and the operators of engines is to determine when to inspect and overhaul the engine, and when to repair or replace the used parts, all of which involve downtime of equipment and high cost for manpower and replacement parts. Failure to deal adequately with any of these challenges may lead to unexpected failures, unscheduled shutdown and a cascade of damage to otherwise sound components.

The state-of-the-art is such that worst-case assumptions for engine operating parameters and its operating environment in conjunction with empirical structural and damage analysis techniques and practical operating experience are used to anticipate the life-limiting modes of damage accumulation and to predict deterministic safe operating life of the different turbine engine components and to fix a predetermined major time between overhaul (TBO) intervals for the engine. Major overhaul is by far the most expensive maintenance action item during the life cycle management of turbine engines. Any system that can provide realistic estimates of component lives would be an improvement on the current state-of-the-art.

Component level internal microstructural damage and distortion due to creep, LCF or TMF, is difficult to detect, and only empirical models are available to guess damage accumulation rates and the critical levels of damage beyond which remedial action would be essential. Current deterministic practices use operating times or numbers of operating cycles required to initiate detectable flaws in a large population of parts under worst case usage, and the statistical distribution of this data is used to determine the lower bound threshold for component replacement, typically −3 standard deviations from mean. This is adopted as the predetermined safe-life limit for all parts, regardless of the fact that the vast majority will contain no detectable flaws at this point, and hence have the capacity for further use. Furthermore, several analyses described in the literature have shown that 999 parts in a typical population of 1000 would, on average, have 10 to 20 lifetimes remaining at this point. This life can be harnessed using inspection based life cycle management of parts but the inspection intervals under creep, fatigue and combined loading conditions can only be developed using material physics based crack propagation modeling techniques.

Engine Parts Life Tracking Systems (EPLTS) have been developed to monitor life consumption and residual life of individual sets of components to schedule a TBO. In these systems, the engine usage is tracked and the speed and temperature data are stored and analyzed to isolate cyclic usage from steady state usage and to isolate mechanical cycling from thermal cycling. However, the life consumption and residual life of different components in EPLTS based systems are still computed using pre-determined safe life limits as opposed to actual usage based predicted life.

Condition based maintenance using diagnostics techniques for preventive maintenance have also been studied and these systems use relatively crude methods to monitor trends and major engine operating parameters such as temperatures and pressure ratios across different stages and fuel burn, from which gross changes in structural integrity may be inferred. Diagnostics based prognostics techniques, however, are only capable of picking gross faults and can be useful in preventing catastrophic failures but cannot be effectively used for residual life assessment purposes.

At present, there is no real-time prognostics system that has been developed for the predictive maintenance of multiple turbine engine components using physics based gas path modeling and loads and damage analysis techniques. Over the last three decades, tremendous advances have been made in improving the engine performance monitoring and data collection and trending capability. These systems typically use sensors and numerous advances have been made in monitoring systems to provide alarms and improve displays However, apart from predicting compressor fouling, the inability of performance monitoring systems to assist with predictive maintenance and TBO prediction remains unchanged. Extensive basic scientific research has indicated that component level failure is caused by usage-based loads that are responsible for the development of damage at the microstructural level. Therefore, continuous quantitative assessment of usage based thermal-mechanical loads and microstructural damage as a function of these service loads is vital for the development of any prognosis systems.

Following an exponential growth in the understanding and use of computational fluid dynamics techniques, the effect of thermal and aerodynamic loads on component level structural response has been extensively studied. While identification of thermal boundary conditions is important for gauging the component level structural response, the effect of underlying deformation and fracture mechanisms on life consumption and residual life has not received equal attention. Traditional research has focused on the computation of worst-case usage loads and the use of empirical damage modeling techniques to predict component level response to these worst-case thermal-mechanical loads. The use of empirical life prediction techniques also requires the generation of large but very expensive material databases along with a lot of field experience to accurately predict the future component behavior.

Evaluation of variability of component life as a result of variability in usage and microstructural features or stochastic material behavior has only recently come under investigation in turbine engineering and materials science respectively, and is generally not used in routine turbine engineering practice for the life cycle management of engines. Variability describes the degree to which gas path temperature profiles and component level usage loads change over time and also changes in microstructural features from one component to another and how these microstructural parameters also change over time during service. The initial distributions of microstructure often exist in a set of components and dynamics of some microstructural variables change over time during service and these distributions and their changes govern the material response to usage based thermal-mechanical loads during future service. A parameter such as the grain size may have an initial distribution in a set of turbine blades and vanes but may remain relatively constant during service, demonstrating a low degree of dynamic variability. Parameters such as intragranular precipitate size, grain boundary precipitate size and dislocation density may possess an initial distribution and their distributions may wildly change or shift with high variability during service. The initial as well as the dynamic variability of the microstructural features along with the variability in thermal-mechanical loads with time must all be considered for accurate life consumption and residual prediction.

The evaluation of inherent grain size variability has proven to contain valuable information regarding the creep behaviour of conventionally cast as well as forged components operating in high temperature and stress operating environments. It can provide accurate and reliable prognostic stratification of the risk of creep fracture in a population of components during service.

In addition, evaluation of grain boundary carbide variability due to primary carbide degeneration during service in cast turbine blades has revealed increased tendency for creep ductility reduction and material embrittlement. Similarly, variability in primary particulate distribution can influence the LCF life of parts.

Thus, initial and dynamic variability of microstructures in individual sets of components along with changes in in-service usage and operational conditions lead to variability in gas path temperatures and thermal-mechanical loads that control the life consumption and residual life. The significance of the evaluation of the effect of individual variables that influence life indicates that the continuous evaluation of multiple components will provide useful and accurate information on the TBO status of the engine. To date, there has been no attempt made to provide the engine users with the variability analysis of life consumption or residual life of multiple engine components on the basis of actual usage and usage based thermal-mechanical loads and material physics based damage analysis, nor provide the capability for continuous real-time variability analysis and display.

SUMMARY OF THE INVENTION

The object of the invention is to provide a physics based prognostics system for continuously evaluating the usage and operating environment based gas path as well as component temperature profiles, thermal-mechanical loads and material damage accumulation in multiple engine components to accurately predict their life consumption and residual life as a function of usage to facilitate proactive repair and overhaul decisions, predict individualized and cost effective TBO for the engine, with the ultimate goal of reducing the cost of ownership of the engine.

Another objective of the invention is to provide a tool to aid in the evaluation of the overall engine structural health by predicting the development of future damage and flaws in components in real-time, in order to provide time for remedial action.

The invention provides methods of monitoring variability of life consumption and residual life of multiple engine components using data acquired from the engine monitoring interfaces, comprising steps of collecting data points acquired by each of the monitoring interfaces and analyzing these parameters using rule based mission profile analysis to discern the type of loads generated during actual engine operation; continuously computing a measure of the variability of gas path temperatures and thermal-mechanical loads including the effects of changing operating environment that in turn govern the degree to which the damage accumulation and life of different components fluctuates over time, and continuously displaying the variability for each of these TBO governing parameters.

The invention further provides an real-time prognostics system for monitoring variability of engine usage parameters, comprising a system coupled to an engine monitor for receiving data points associated with the changes in engine operating parameters, the prognosis system being adapted for an engine to trigger analysis and continuously compute, for each of the components being monitored, a variability representative of an estimate of the degree to which the thermal-mechanical loads and damage accumulation fluctuates over time; and means for continuously displaying the variability in life consumption and residual life for each of the engine components being monitored.

The paradigm that underlies the invention is one of complex systems, where the focus is on the emergent multiple component level response to composite of service variables, load changes and damage accumulation processes or the response of the major components of the engine. The focus of the invention is to facilitate individualized engine care, under an assumption that different engines of the same type require completely different types of interventions for their life cycle management.

By providing simultaneous analysis and display of the variability of damage accumulation and life consumption of individual engine components using accurately measured engine parameters, the effect of different usage scenarios on component level response can be studied off-line. Variability of multiple usage parameters can be used to detect potential engine structural problems and the invention also permits studying alterations to the usage, component level design or material change in order to arrive at a solution to a potential structural problem.

Engine operational parameters capable of variability assessment include any parameter that can be accurately measured. The parameters are ideally measured at regularly recurring intervals and these include engine operating parameters (speed, exhaust gas temperature or turbine inlet temperature, power, inlet and exhaust pressure, bleed air fraction, and others) and operating environment parameters (ambient temperature, ambient pressure, altitude). Patterns of variability include the analysis of how several parameters change over time in concert.

This continuous and simultaneous analysis of the variability of multiple engine parameters provides a means for removing the artifacts and real-time identification and differentiation between types of loads and the engine response to these loads.

The present invention provides for continuous and simultaneous variability analysis and display of multiple engine components, in order to analyze usage based:

combustor temperature profile and the pattern of variability in combustor nozzle plane temperature profile on a real-time basis, component temperature profiles and stress, strain and temperature values operative in different component locations, damage analysis for determining physics based life consumption and residual life under creep, low cycle fatigue, thermal fatigue, thermal-mechanical fatigue, cyclic oxidation, stress corrosion, corrosion fatigue, fretting wear, fretting fatigue, high cycle fatigue, oxidation, hot corrosion and combined loading conditions, fracture critical locations, component distortion, component surface condition, crack nucleation life, crack propagation based safe inspection intervals that serve as a guide to select the most cost effective TBO.

In accordance with one aspect of the invention, there is provided a system for real-time assessment and prediction of residual life of engine components, the system comprising: a graphical user input interface for inputting engine operating information, component model and material information and material properties data into a prognostic software database, a prognostics processor for prognostics analysis, and an output interface for displaying information indicative of residual life of engine components, the graphical user input interface, the prognostics processor and the output interface being synchronized through a software.

In accordance with another aspect of the invention, there is provided a method for real-time assessment and prediction of residual life of machine components, the method comprising the steps of:
a) continuously monitoring variability of engine operating parameters and engine operating environment,
b) performing the usage and operating environment based crack nucleation, crack propagation, distortion, corrosion or erosion analysis for life consumption and residual life prediction of multiple structural components of a turbine engine,
c) predicting the development of the intrinsic as well as extrinsic state of damage in these structural components before the development of any discernable faults or damage in these components that may be manufactured out of metallic, ceramic or a combination of both types of materials using standard data acquired from engine monitoring interfaces.

In other words, there is provided a system for monitoring variability of usage based life consumption and residual life of multiple engine components in real-time by monitoring engine operating parameters, the system performing the steps of: collecting engine operating parameters and analyzing these parameters and using real-time combustor modeling, off-design engine analysis, thermodynamic modeling and thermal-mechanical structural analysis to discern the type of loads generated during actual engine operation; continuously computing a measure of the variability of thermal-mechanical loads operative in different components that in turn govern the degree to which the damage accumulation variability evolves and life of different components fluctuates over time, and continuously displaying the variability for each of these TBO governing life prediction parameters.

The method for continuous and simultaneous analysis of the variability of multiple engine parameters provides a means for removing the artifacts and real-time identification and differentiation between types of loads and the engine response to these loads. The step of removing artifacts comprises the steps of using a combination of analysis techniques for engine speed variation and homologous temperature variability analysis to identify undesirable data points.

The method further comprises a step of computing the variability of combustor temperature profile due to variability of service operating conditions and the plurality of evolving combustor defects and damage parameters.

The method further comprises a step of computing the variability of thermal-mechanical load profile of components due to variability of service operating conditions and selecting which profile contributes to what type of damage such as creep, LCF, TMF, corrosion, corrosion fatigue, stress corrosion, cyclic oxidation, creep crack growth and fatigue crack growth or combined damage mechanisms.

The method further comprises a step of computing the variability of damage accumulation in components due to variability of service operating conditions and the plurality of evolving component microstructure and damage and selecting the microstructural features that contribute to damage due to creep, LCF, TMF, HCF, corrosion, corrosion fatigue, stress corrosion, cyclic oxidation, creep crack growth and fatigue crack growth and the combined damage mechanisms.

The method further comprises the step of displaying real-time correlation between the variability of engine parameters and the plurality of component condition parameters such as the five major fracture critical locations, residual life, distribution of the residual life of a set of components.

BRIEF DESCRIPTION OF THE DRAWINGS

The invention will be explained in more detail by way of the following description in conjunction with the drawings, in which.

DETAILED DESCRIPTION OF THE INVENTION

Figure 1:
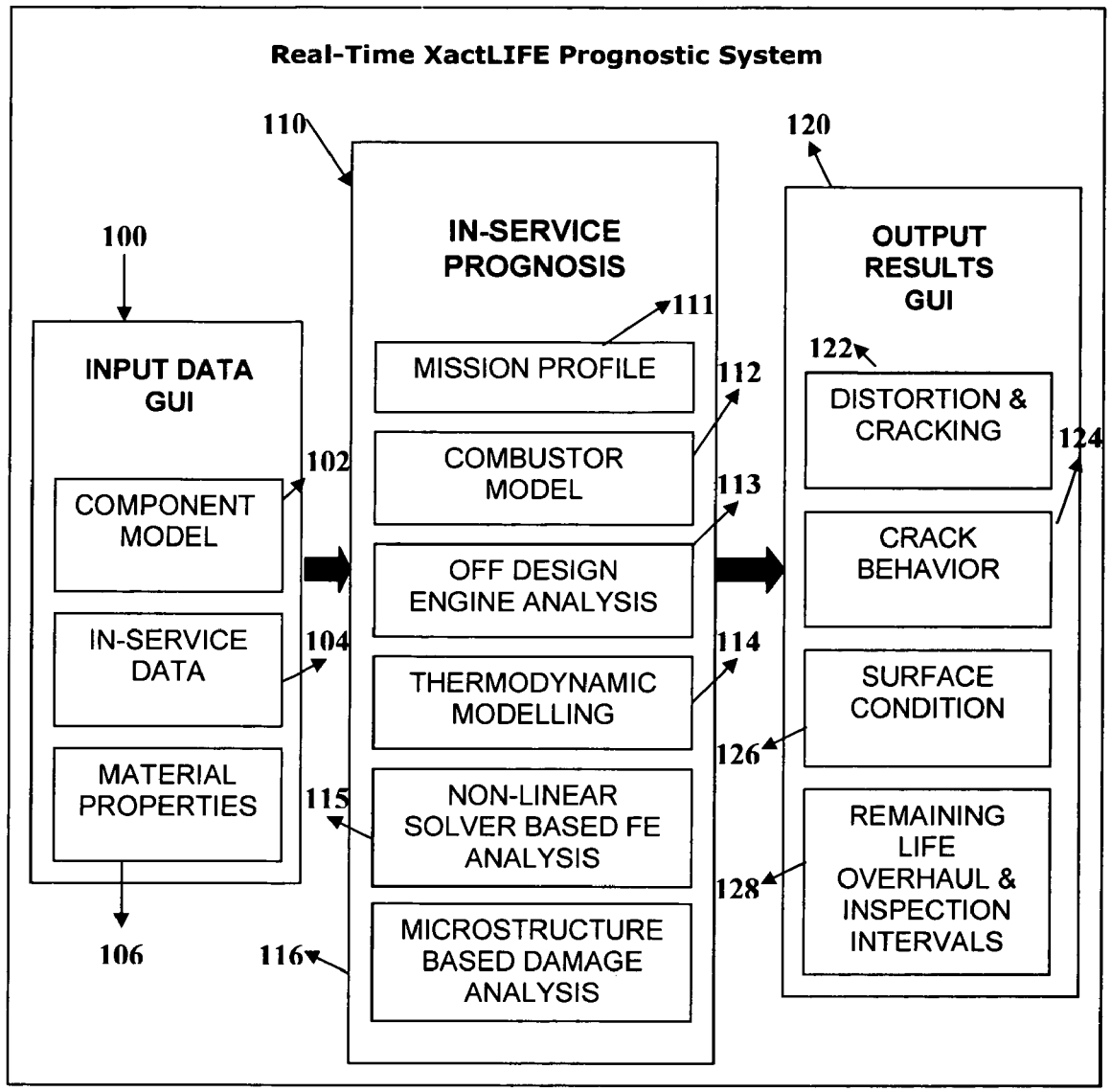
FIG. 1 presents the flow diagram of the real-time prognosis system invention.

FIG. 1 illustrates a computer-based prognostics system consisting of three main parts: input interface 100, prognostics processor 110 and output interface 120 which are synchronized through a software architecture. In the part 100, the input interface has a finite element component model 102, in-service operating data 104 (temperature, pressure, rpm, etc.), from pre-existing sensors and signal processing modules installed in the machinery under investigation; and material properties data 106. The prognostics processor 110 consists of a mission profile analyzer module 111, a combustor modeling module 112, off-design engine analysis module 113, thermodynamic modeling module 114, non-linear finite element analysis module 115, and a microstructure-based damage analysis module 116. The flow of information between these modules is explained in more detail in FIG. 17.

The output interface 120 consists of distortion and cracking data 122, crack behaviour data 144, surface condition data 126 and remaining life overhaul and inspection intervals data 128. As indicated by the arrows, the output from the input data interface 100 provides the input to prognostics processor 110, and the output from the processor 110 is then input to the output analyzer 120 to provide the results about the present and future physical state of the machine under investigation.

Figure 2:
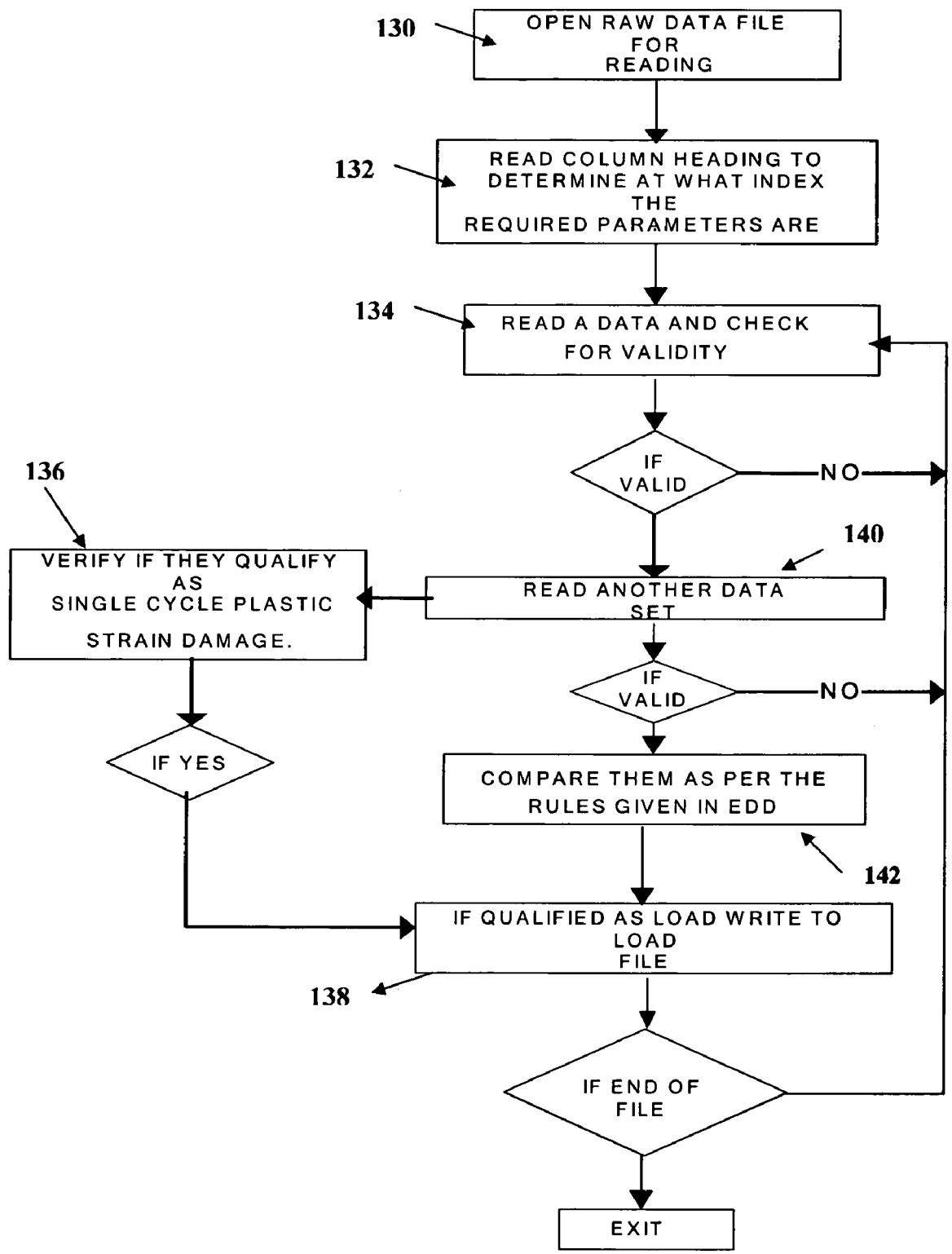
FIG. 2 is a block diagram of an embodiment of the mission profile analyzer.

The module 111 is explained in detail in FIG. 2. The module opens the raw engine mission data file 130 and reads only the parameters needed 132, checks the validity of the data 134 and then compartmentalizes them, as per rule-based logic, into either cyclic load 136 including the quantification 138 of the magnitude of the cyclic load, or a steady state load 140 including the quantification 142 of the operable temperature at the steady state load, and then writes the data 138 to the load file.

Figure 3:
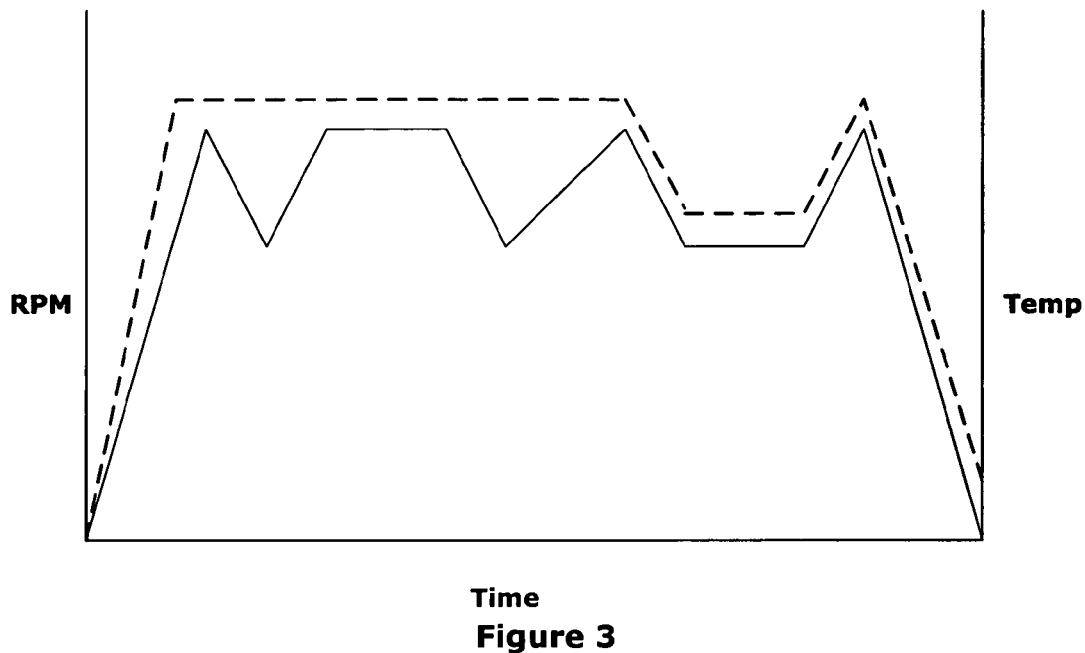
FIG. 3 is a typical output of the mission profile analyzer displaying cyclic loads and temperature variability.

FIG. 3 is the end result from the mission profile analyzer displaying cyclic load and temperature variability.

Figure 4:
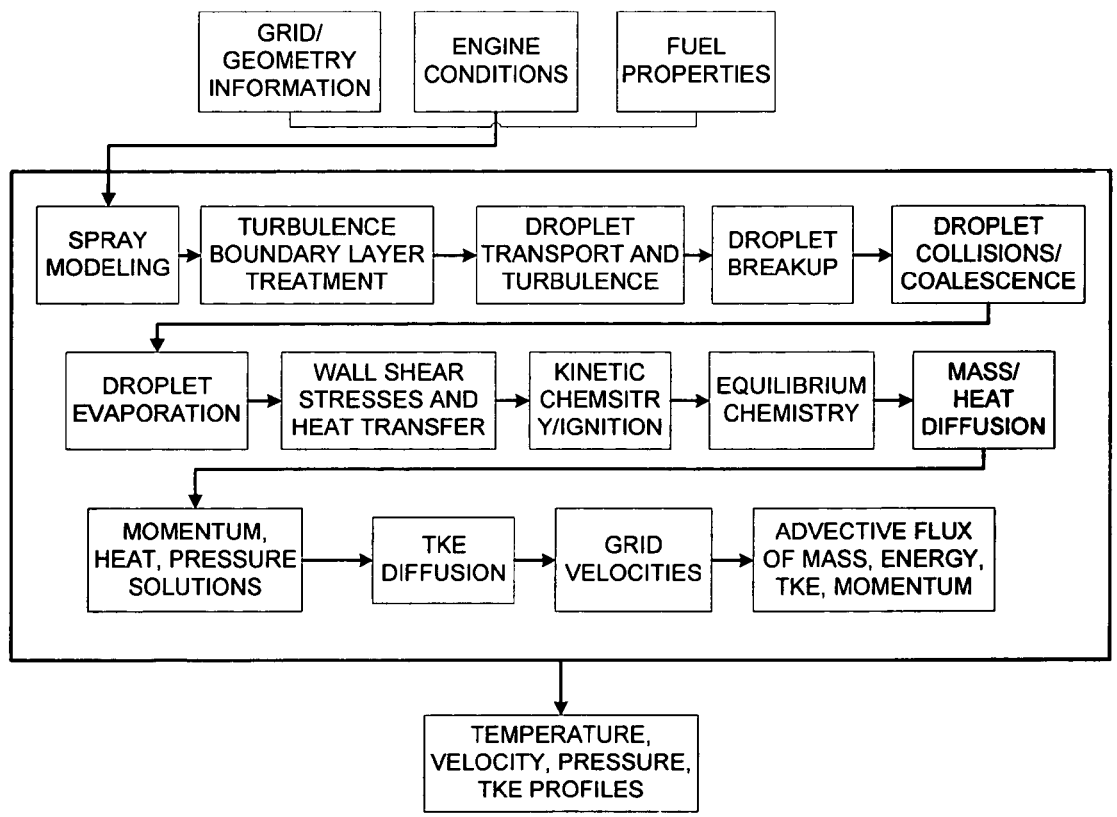
FIG. 4 is a block diagram of an embodiment of the combustor model having central variability analysis capability along with its own GUI and display.

FIG. 4 illustrates the details of the combustor model 112 which discerns combustion conditions for the engine operating environment and outputs temperature, velocity and pressure profiles using either the semi-empirical relations or computational fluid dynamics (CFD) based modeling techniques.

Figure 5:
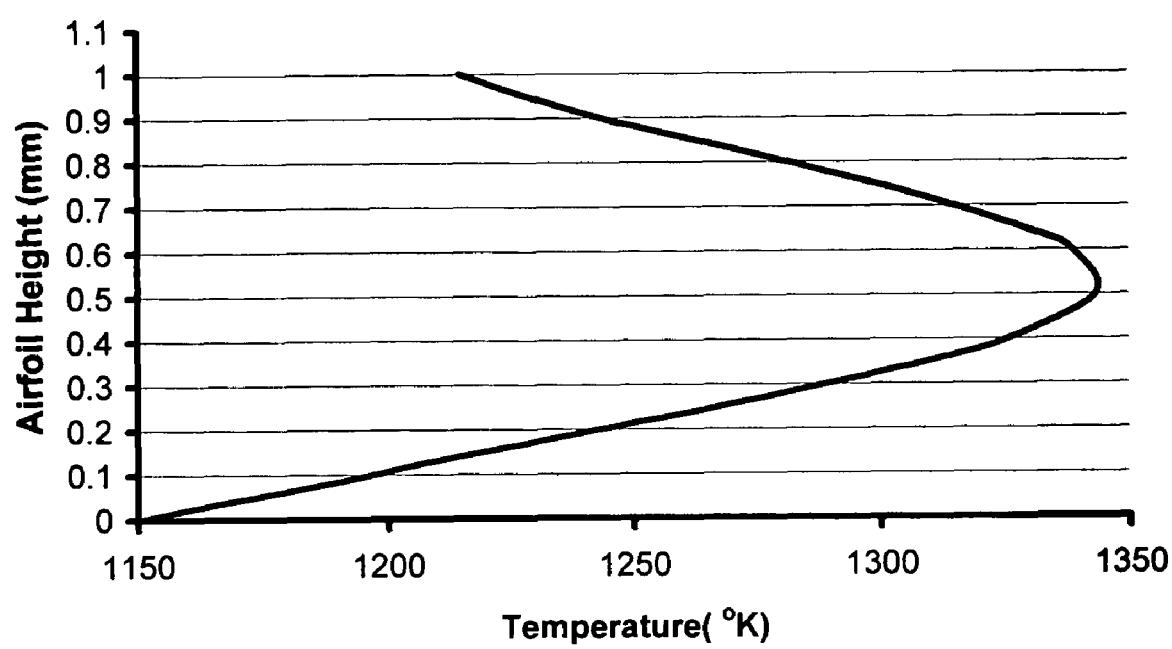
FIG. 5 is a typical output of the combustor model displaying combustor nozzle temperature variability.

FIG. 5 shows a typical combustor nozzle temperature profile.

Figure 6:
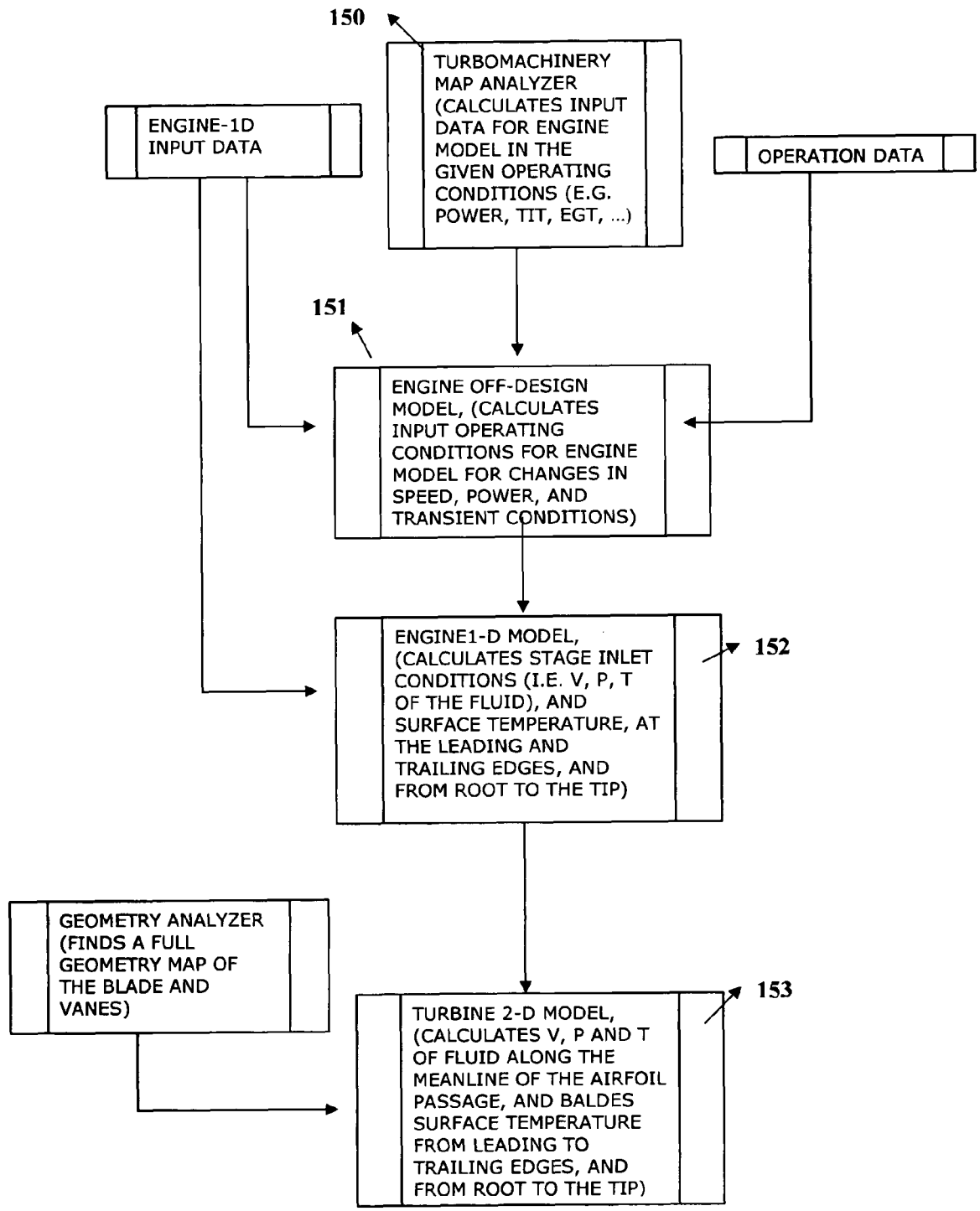
FIG. 6 is a flowchart illustrating the main steps of an embodiment of the off-design engine analysis and potential flow based thermodynamics analysis methods
Figure 7:
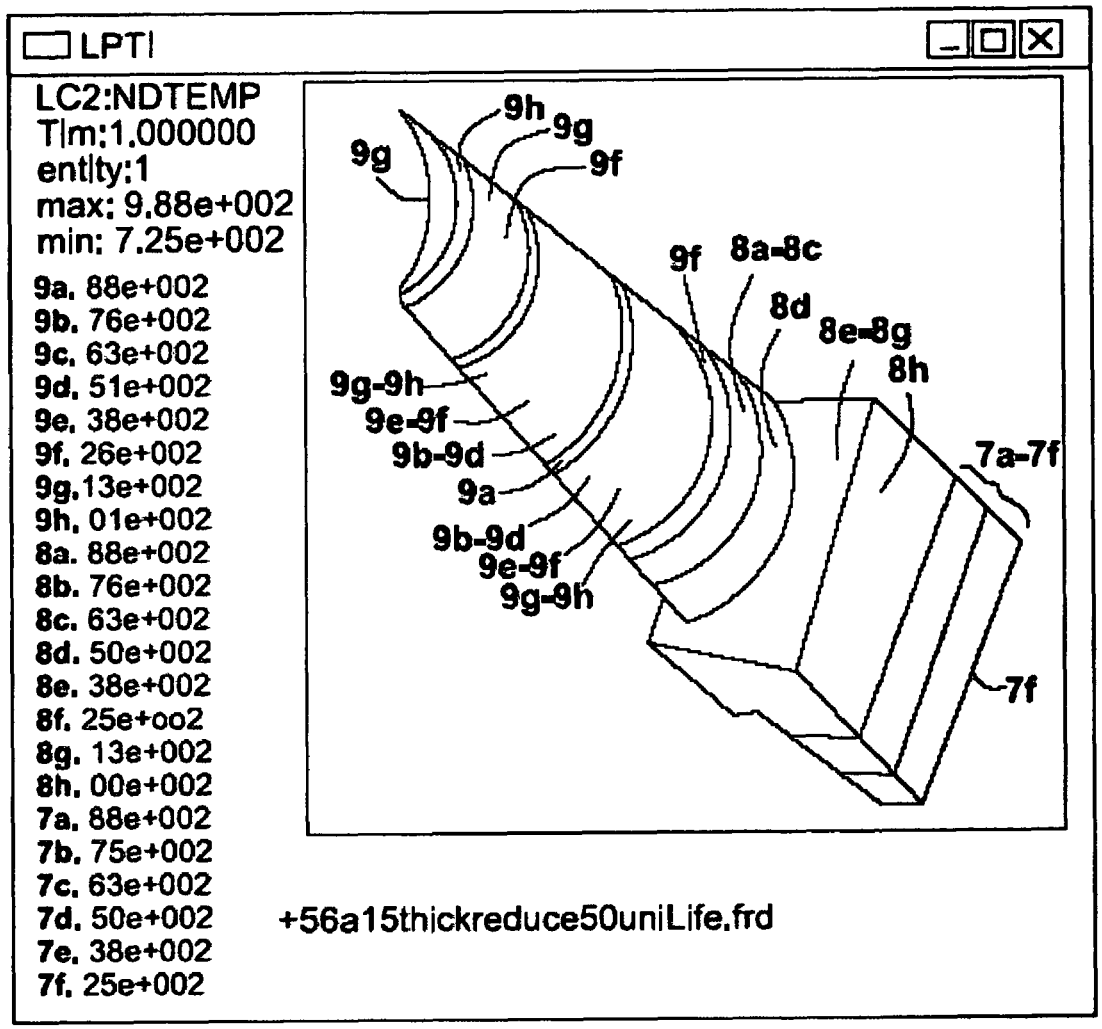
FIG. 7 is a typical output of the off-design engine analysis and thermodynamic analysis models displaying engine temperature variability.

Referring to FIG. 6, in the off-design engine modeling module 113, the individual turbine and compressor have well defined operating characteristics in the form of maps that are used as input to the algorithm inherent in the module 113. In Block 150 the turbine map and compressor map are used to calculate the basic input data for the engine model for the given operating conditions which acts as the input for the Off-Design engine model block 151; the algorithm finds an operating point on the compressor map and turbine map when the turbine engine is running at a given condition; this is followed by semi-empirical thermodynamic analysis, block 152, to compute the axial temperature as well as chord-wise temperature profiles of all hot gas path components; the thermodynamic module 114 is used to get certain node temperatures at the leading and trailing edges of the airfoil of the component as shown in block 153; the flowchart explains the process flow for engine temperature and FIG. 7 shows the end result of the thermodynamic model computation and the temperature profile data along with the mechanical loading data in terms of engine rotational speed and the pre-programmed finite element models of components are automatically fed as inputs to the non-linear FE solver 115 to compute the combined thermal-mechanical stresses, plastic strains and temperatures that are operative at different nodes of the component finite element models.

Figure 8:
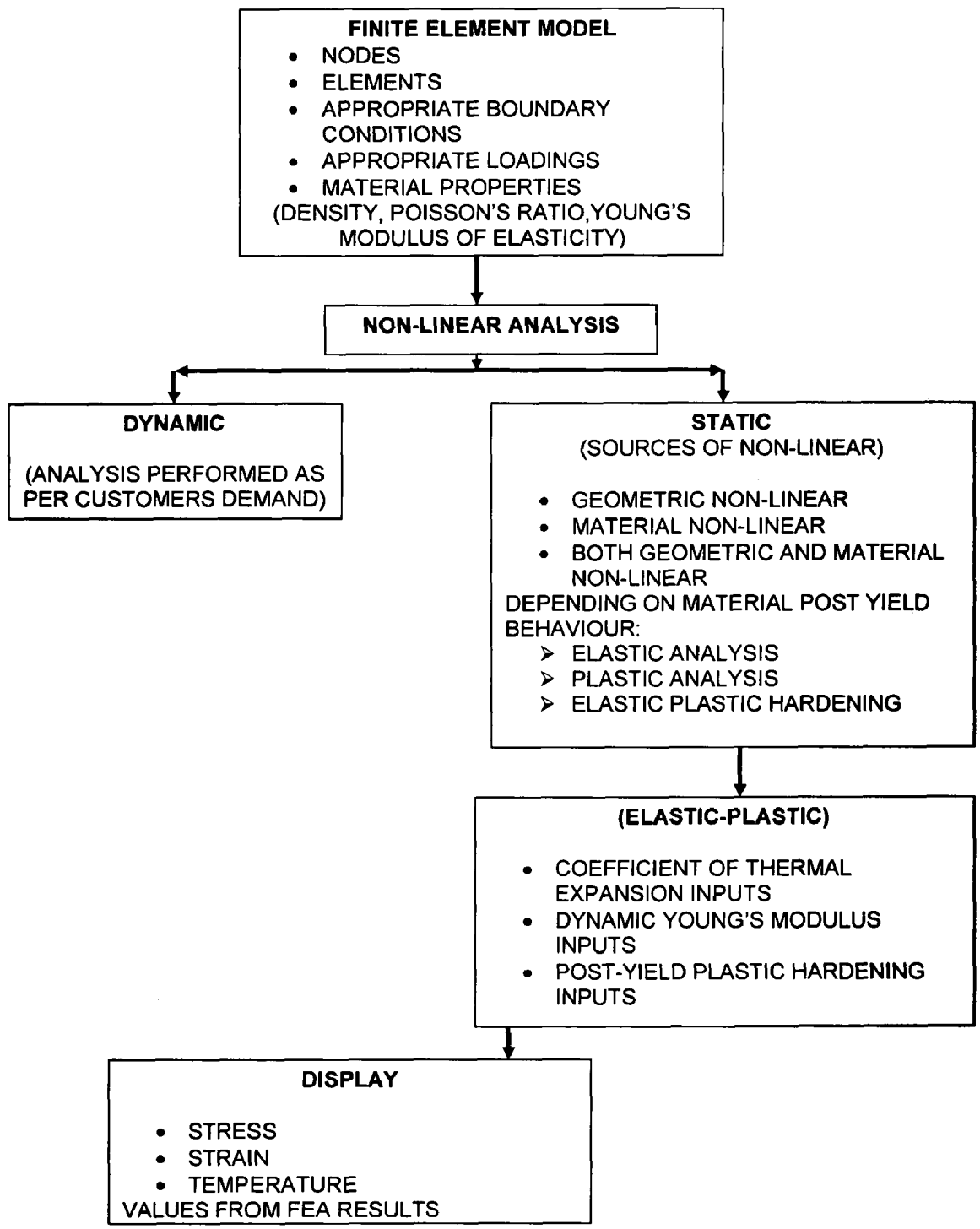
FIG. 8 is a block diagram illustrating exemplary inputs and outputs of the real-time, non-linear finite element solver and displays for individual variables.

Referring to FIG. 8, the individual nodal loading data is in turn automatically fed into the microstructure-based damage models 116 to compute the creep, low cycle fatigue and thermal-mechanical fatigue life of the individual nodes of a given component; This process determines the fracture critical locations within a given component and the remaining useful lives of hot gas path components as a function of engine usage.

Figure 9:
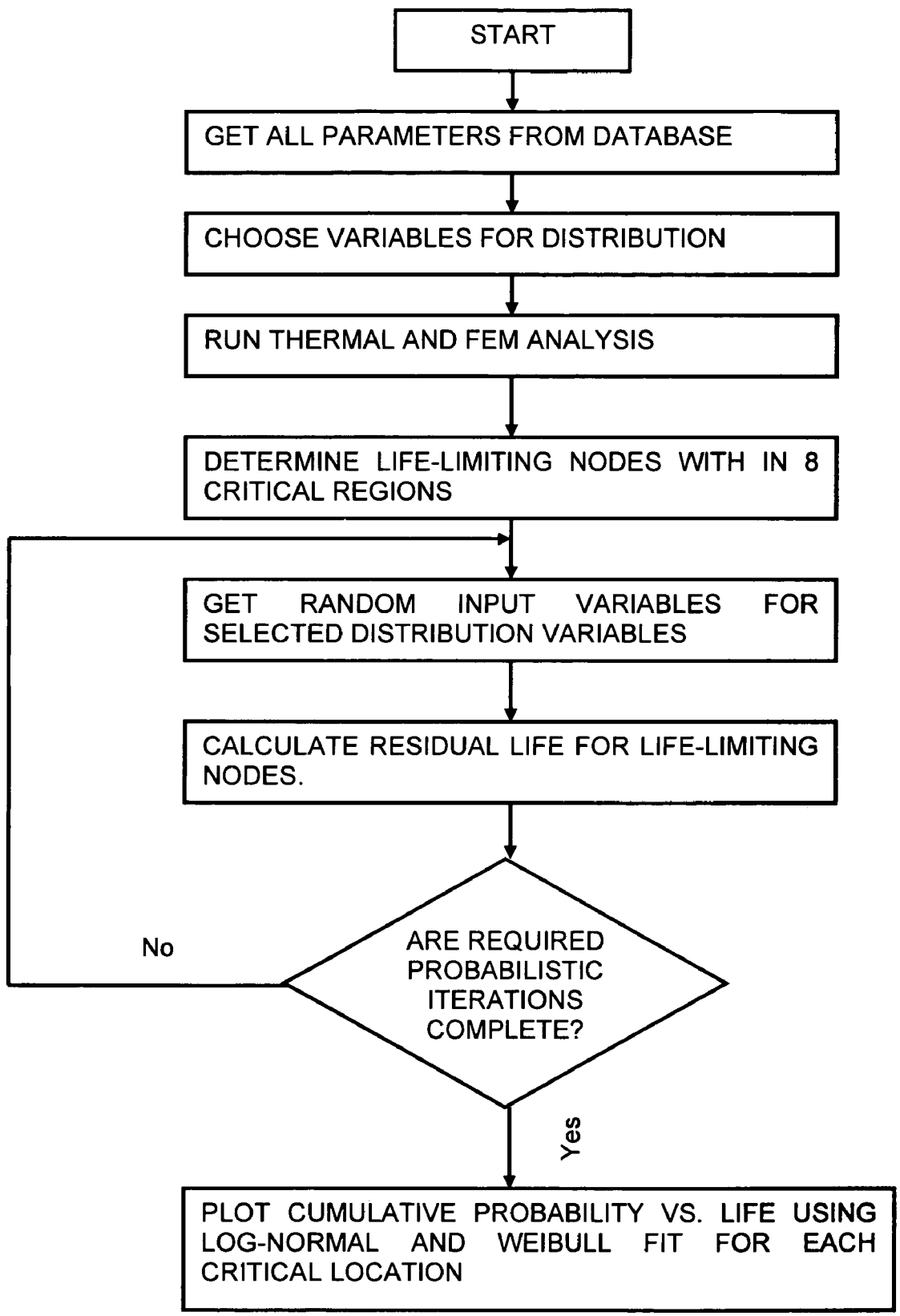
FIG. 9 is a block diagram illustrating exemplary inputs and outputs of the real-time, physics based damage models and probabilistic displays for individual variables.
Figure 9A:
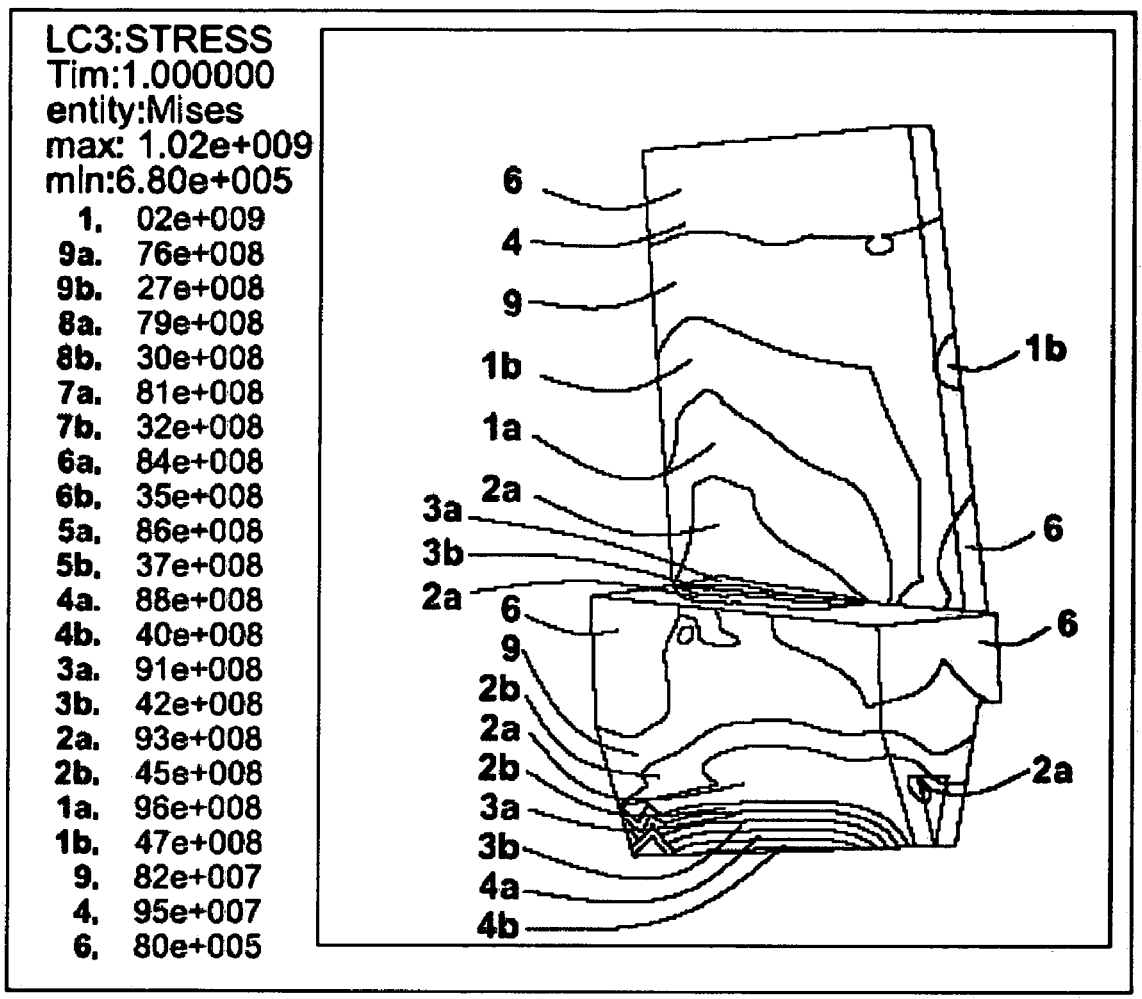
FIG. 9(a) illustrates exemplary variability of component stresses.

FIG. 9(a) illustrates exemplary variability of component stresses.

Figure 9B:
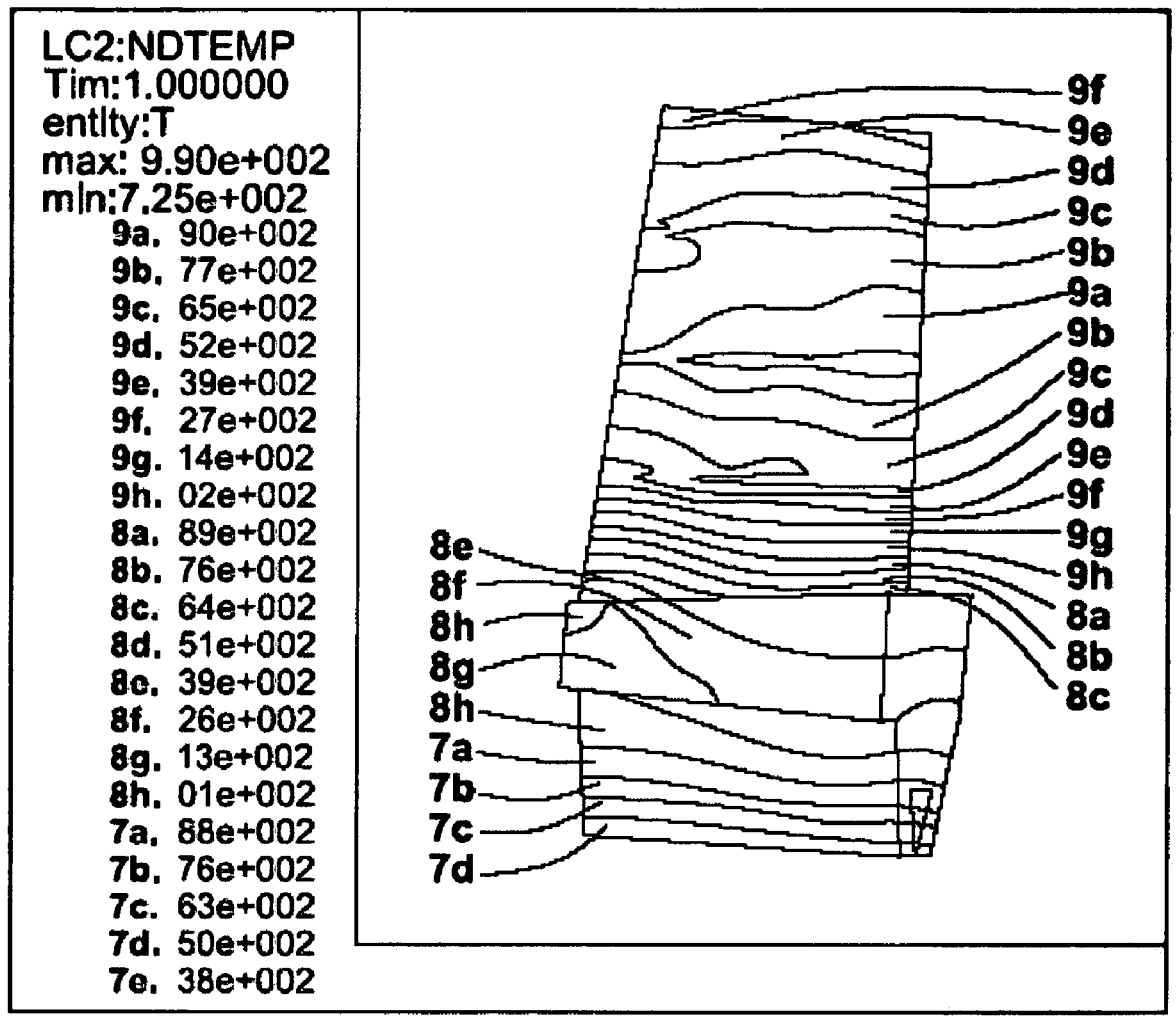
FIG. 9(b) illustrates exemplary variability of component temperature.

FIG. 9(b) illustrates exemplary variability of component temperature.

Figure 9C:
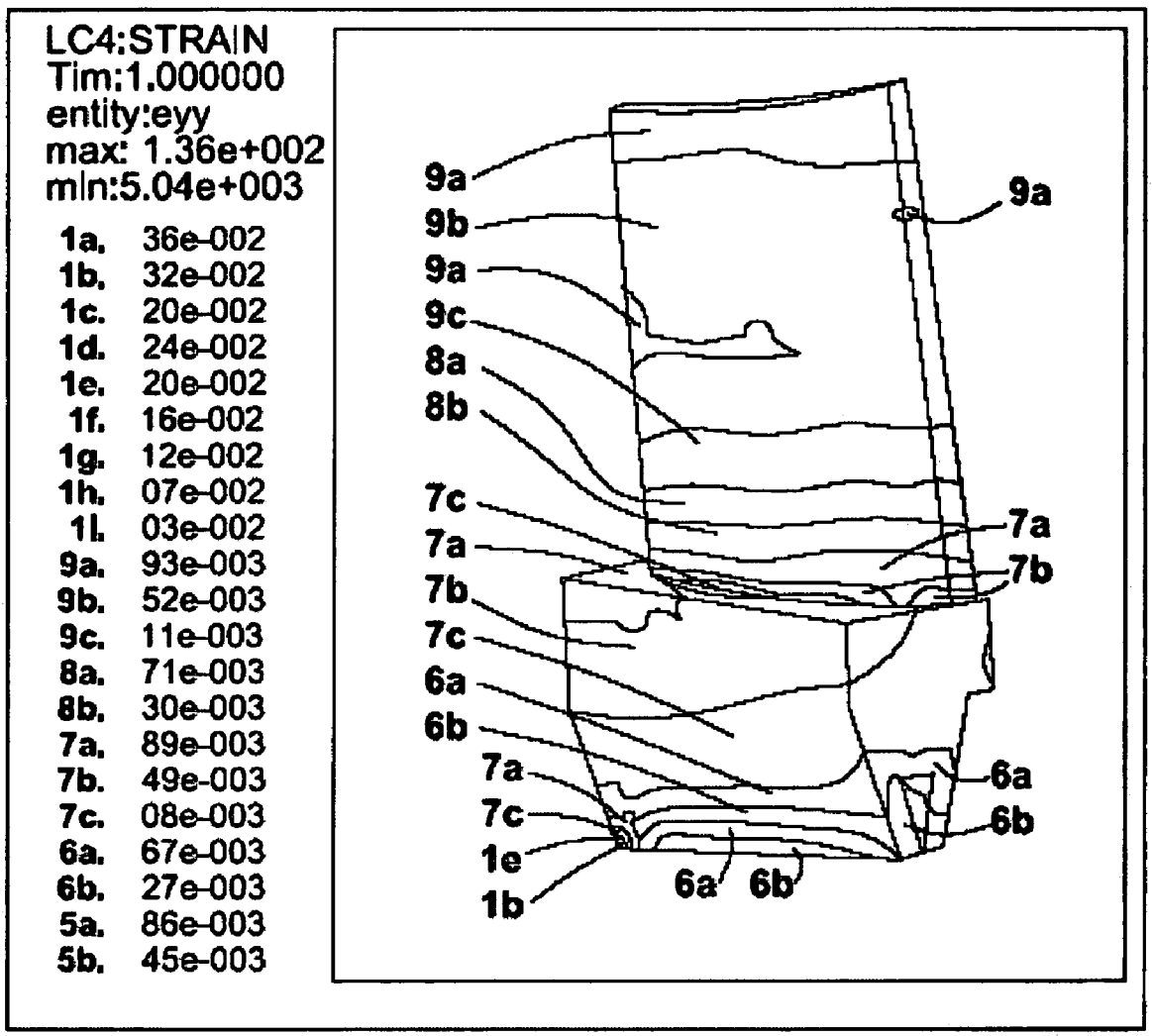
FIG. 9(c) illustrates exemplary variability of component strain.

FIG. 9(c) illustrates exemplary variability of component strain.

Figure 10:
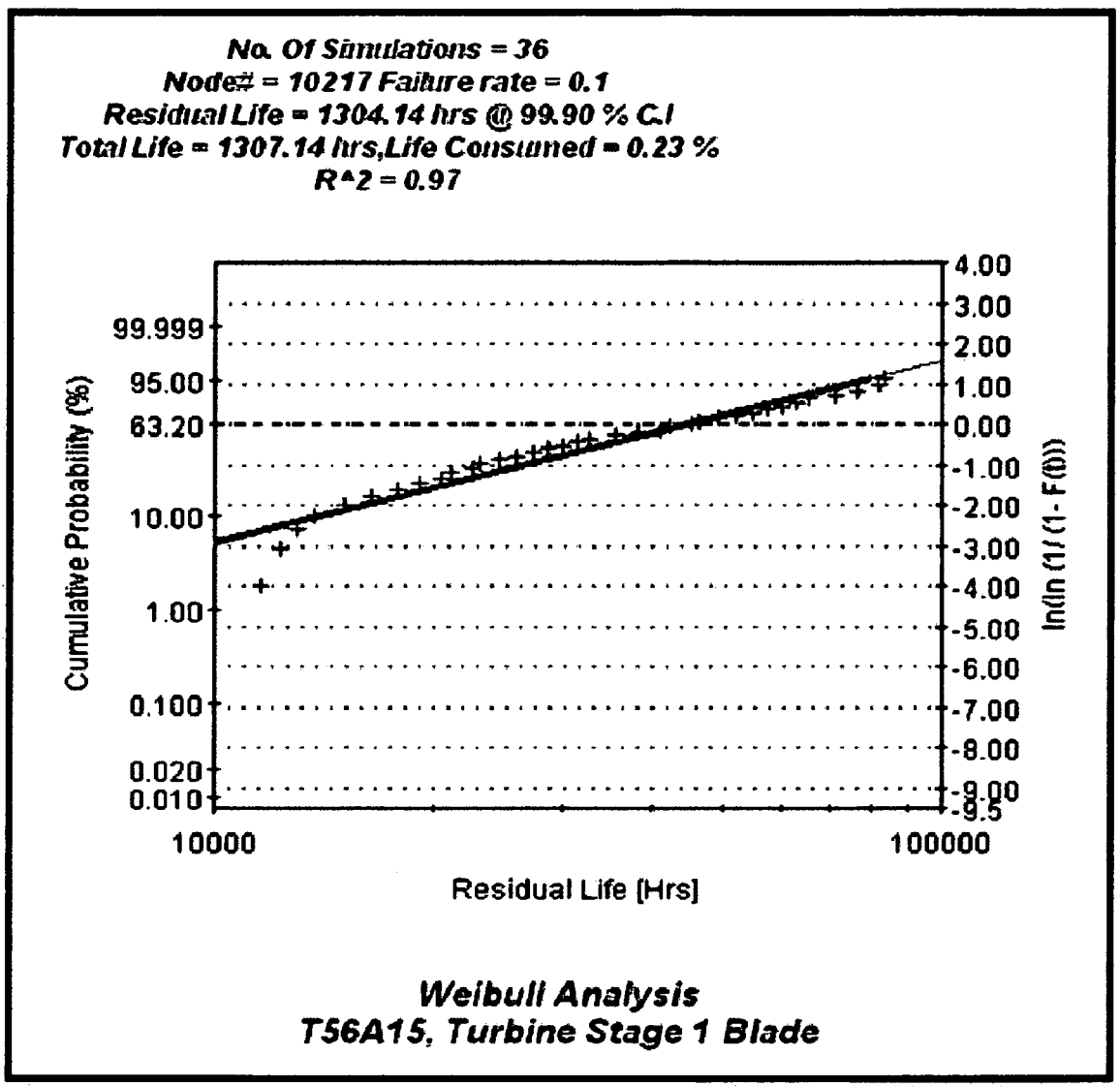
FIG. 10 illustrates exemplary plots correlating data points for the variability of life in the FE model.
Figure 11:
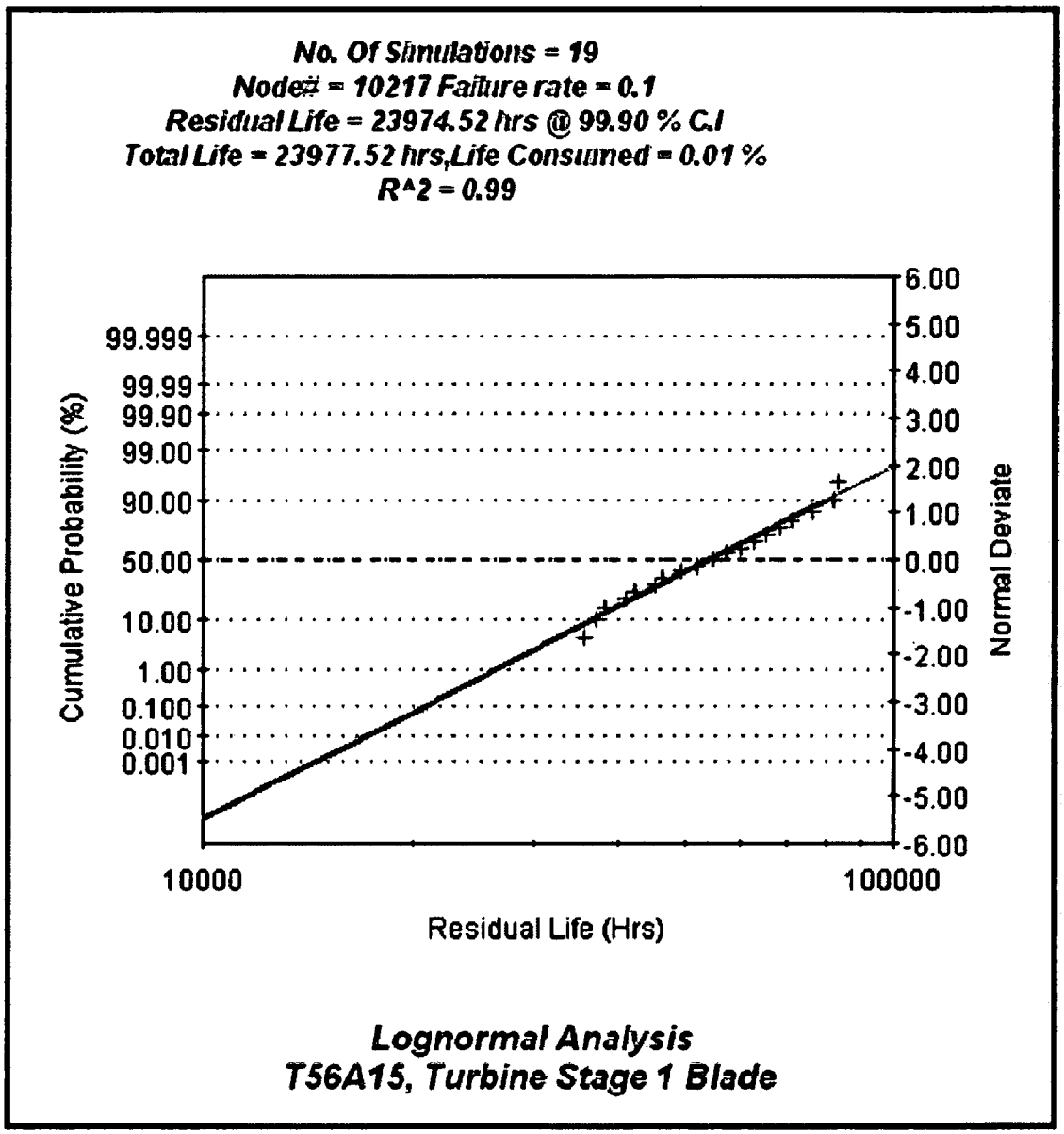
FIG. 11 illustrates exemplary plots correlating data points for the probabilistic variability in life for a single fracture critical location in the FE model.
Figure 12:
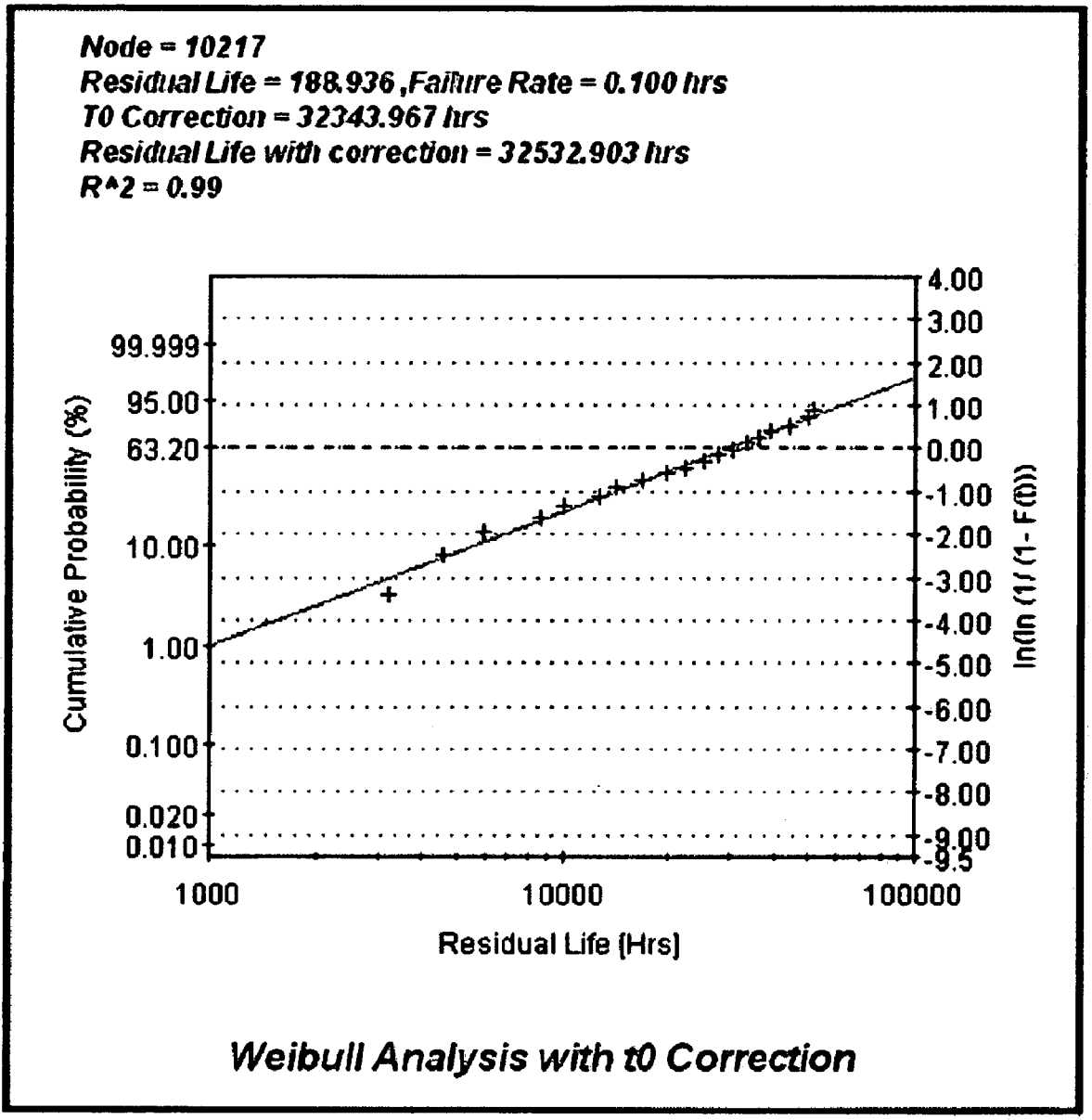
FIG. 12 illustrates exemplary plots correlating data points for the variability of life in probabilistic distribution of primary, secondary and tertiary fracture critical locations.
Figure 14:
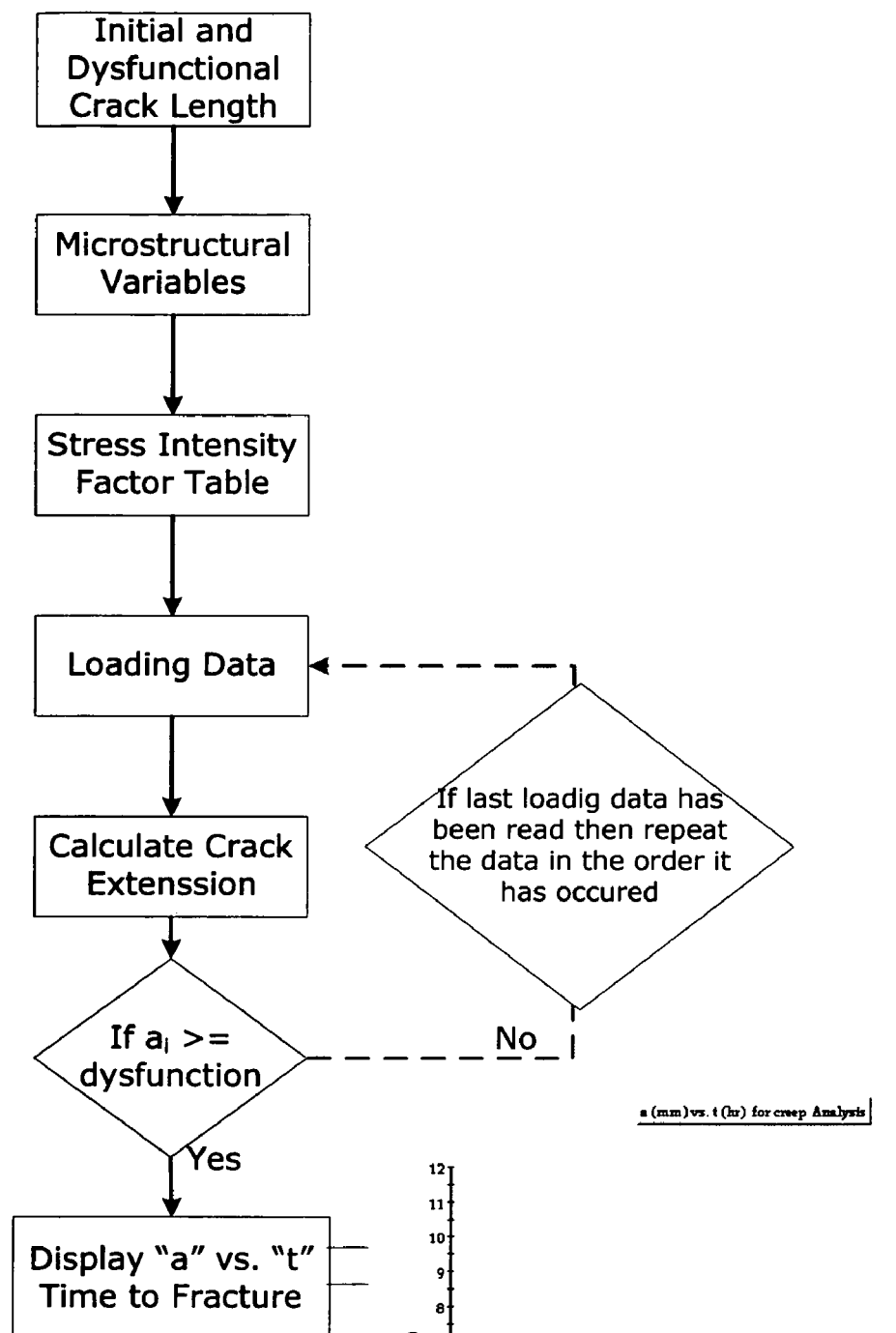
FIG. 14 shows a deterministic fracture mechanics (DFM) flow diagram and output for crack propagation interval and safe inspection interval prediction.
Figure 15:
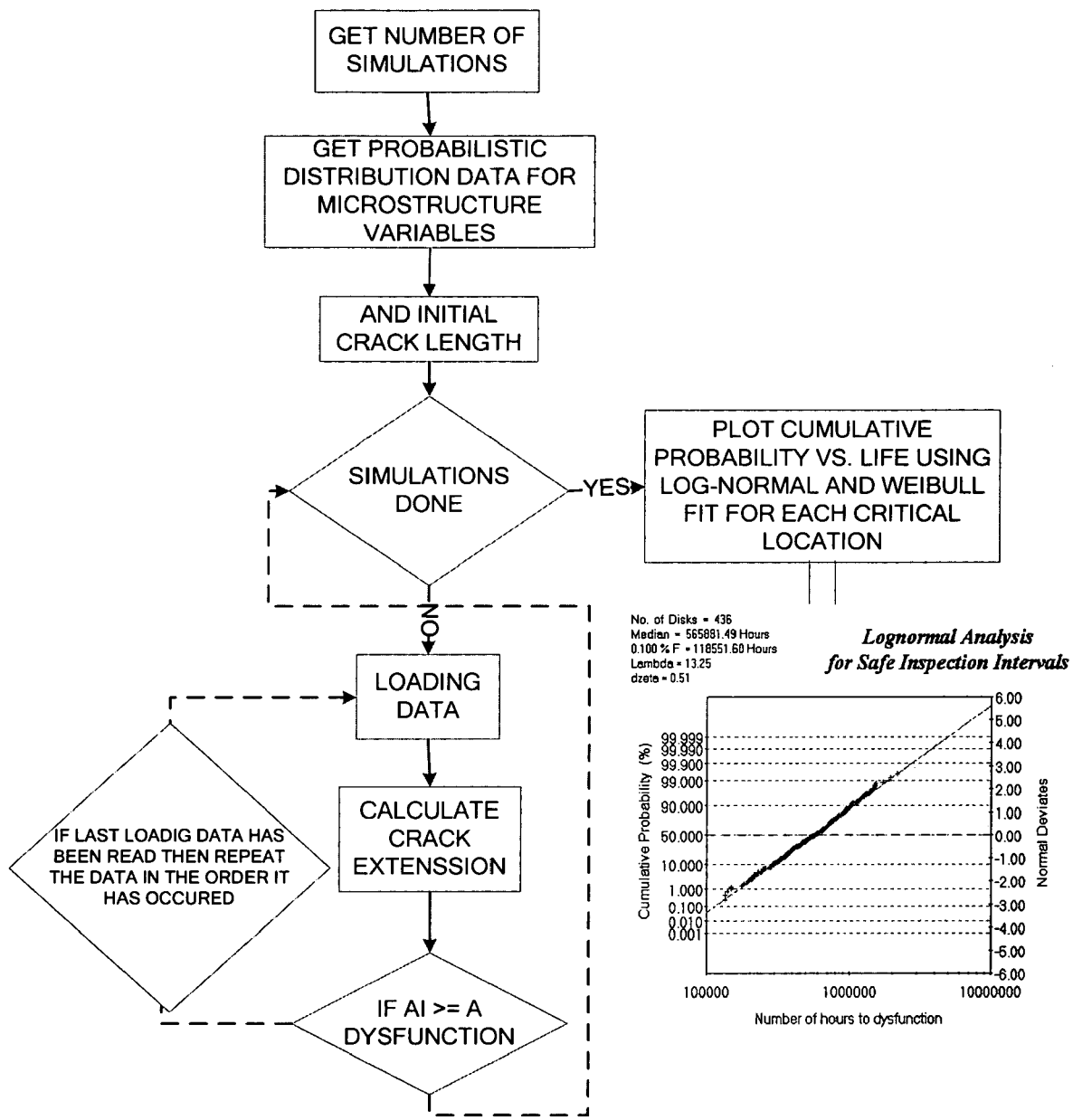
FIG. 15 shows a probabilistic fracture mechanics (PFM) flow diagram and PFM output for crack propagation interval prediction and risk assessment.
Figure 16:
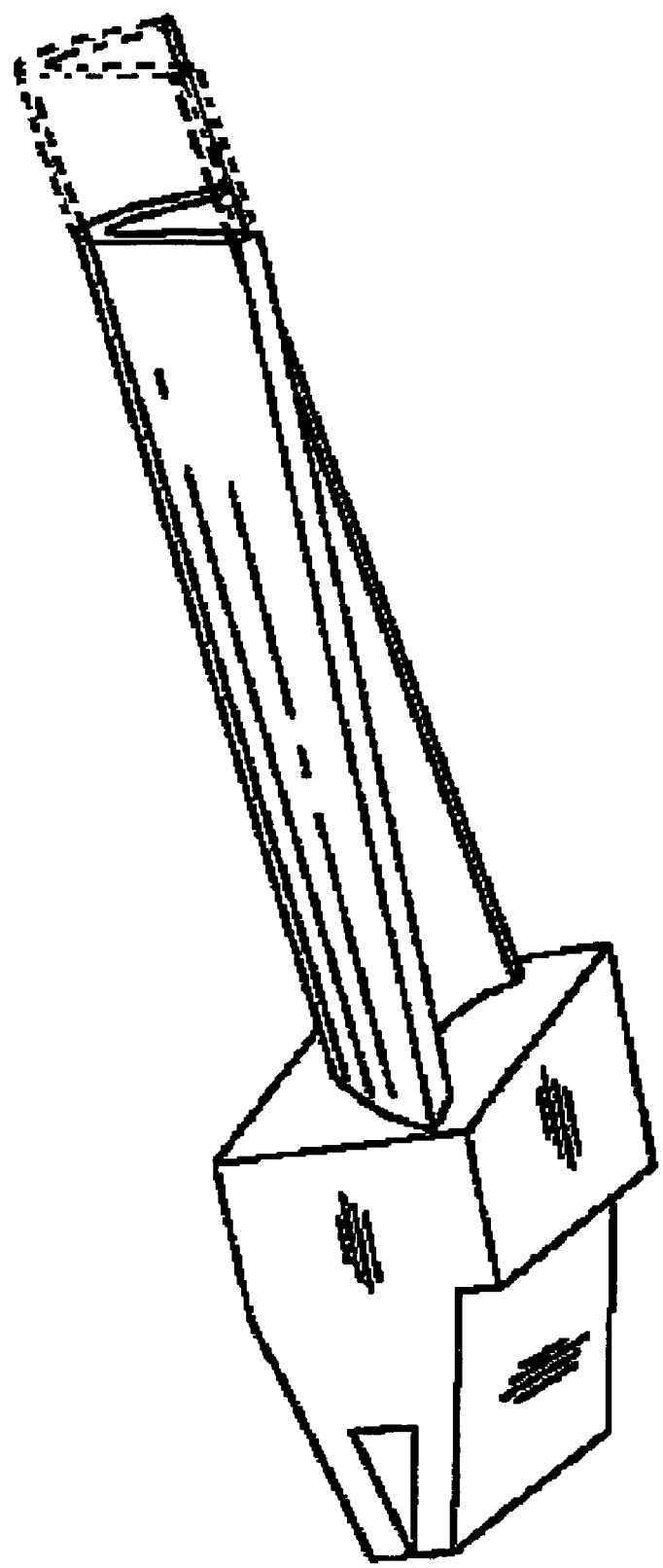
FIG. 16 illustrates lengthening prediction of hot section airfoil distortion as a result of service exposure using the invention.

Referring to FIG. 9 and FIG. 15, the probabilistic model is used for conducting microstructural variability based probabilistic life analysis and risk assessment of the component and this is performed in various steps; in the first step the required distributions for a damage controlling microstructural variables are obtained and the three kinds of distributions used in the system are Normal, Weibull and Lognormal as shown in FIG. 10 and FIG. 11. These distribution bounds are defined by the user/data and this is followed by life calculations of major fracture critical locations using the distribution data; computing residual life for crack nucleation, specific level of component distortion as shown in FIG. 16 and crack growth based crack propagation and inspection intervals as shown in the insets in FIG. 14 and FIG. 15. The residual life distributions computed for the component are displayed as cumulative probability of failure versus residual life plots using lognormal and Weibull analysis techniques and these plots are used to quantify risk associated with following a specific life cycle management or usage strategy.

Figure 13:
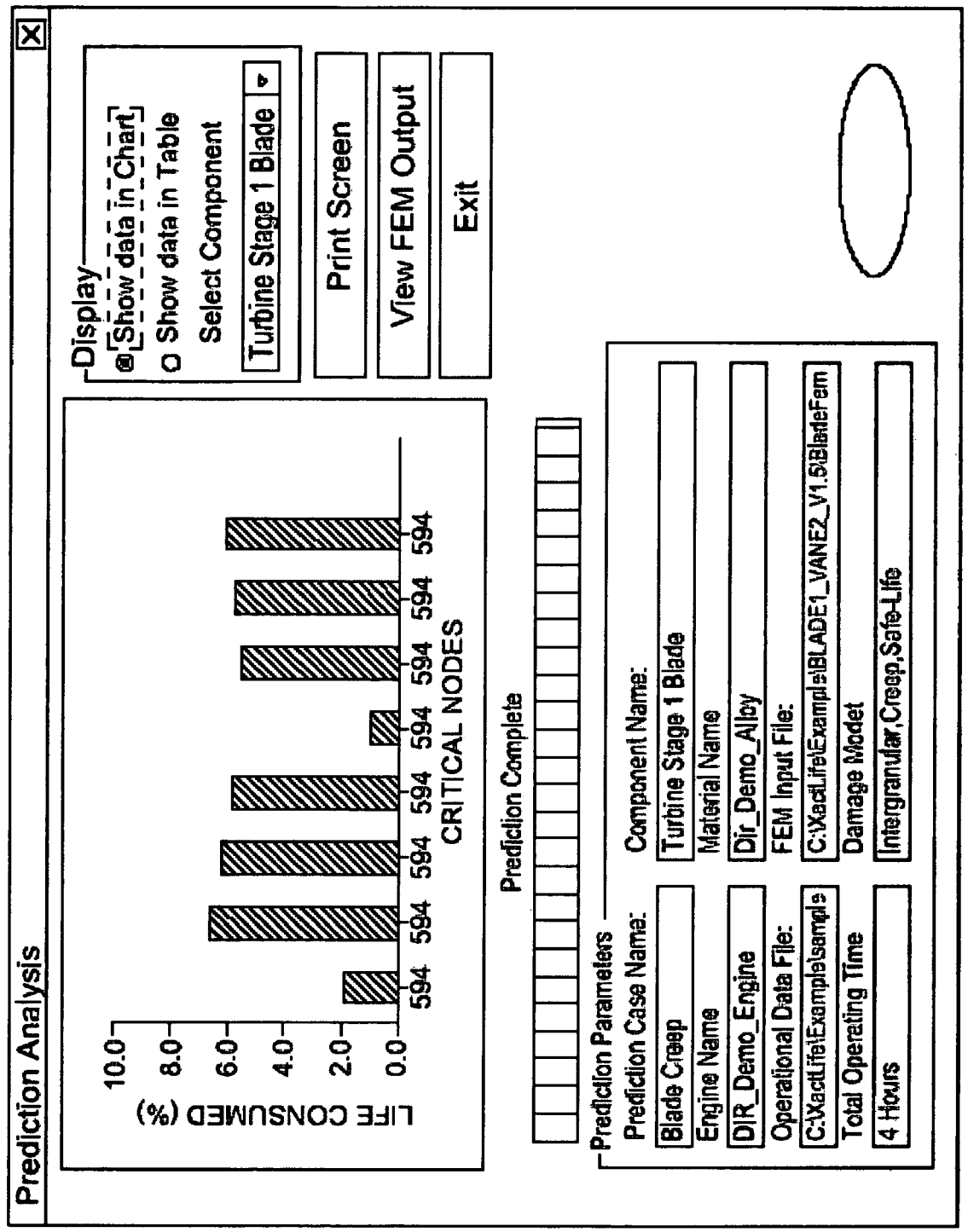
FIG. 13 illustrates exemplary review displays of variability of life in the form of histograms.

FIG. 13 is an example of the output of life results section 40 (FIG. 1) displayed in the form of a histogram for different fracture critical locations of a component.

Referring to FIG. 14 and FIG. 15, safe inspection interval prediction based on crack growth analysis is used to quantify risks associated with the life cycle management strategy using specific non-destructive inspection techniques to inspect the components at overhaul or during field inspection and to recommend the frequency of inspection to minimize probability of failure during engine operation.

Figure 17:
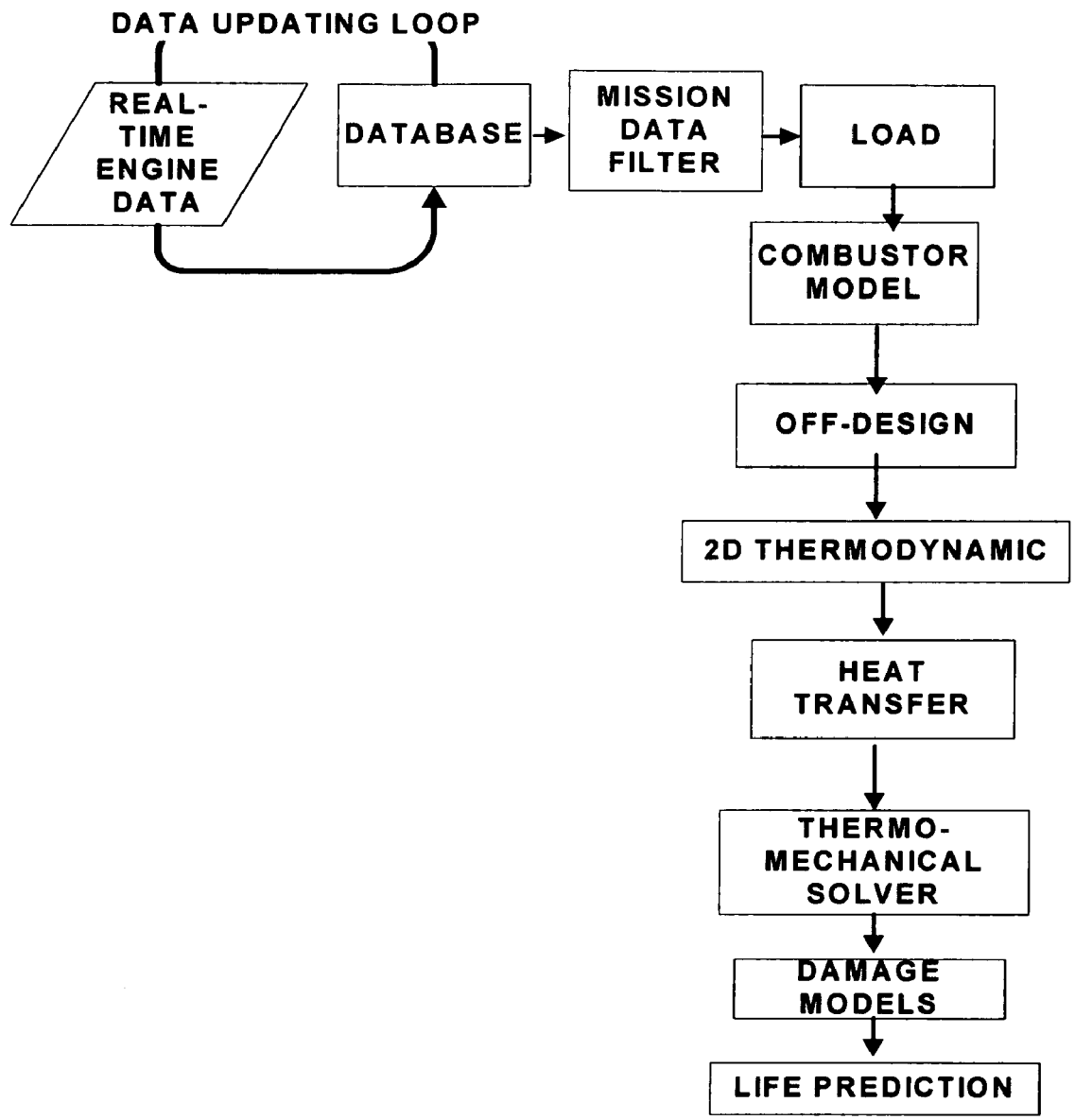
FIG. 17 is a software process flow for real-time prognostics analysis of multiple turbine components.

FIG. 17 shows the self explanatory process flow of software designed on the basis of the block diagram as shown in FIG. 1.

The methods followed in the proposed system are unique because the entire process of following different analytical techniques, related to different fields of gas turbine engineering is conducted continuously in a logical sequence with the aid of appropriate graphical user interfaces and physics based modeling techniques; and the uniqueness of the approach also lies in the use of physics based damage models as opposed to using empirical models, as is done by the OEM off-line, as a function of actual real-time engine usage, without using correlation coefficients or factors in the XactLIFE real-time prognostics system.

What is claimed is:

1. A physics based prognostics system for real-time prediction of remaining life prior to crack or flaw nucleation and prediction of residual life of engine components in the presence of a flaw or distortion, the system comprising:

a graphical user input interface for inputting in-service machine operating data collected from sensors and signal processing modules installed in a machine under investigation, finite element model and quantitative microstructural parameters and internal state variable material parameters of a component of the machine, temperature dependent physical and mechanical properties of the component including creep, low cycle fatigue, thermal mechanical fatigue, high cycle fatigue, creep crack growth rate, fatigue crack growth rate oxidation, hot corrosion, corrosion fatigue, into a prognostics software database, a prognostics processor that contains materials engineering based damage rules and material microstructure and internal state variables based damage accumulation and fracture models for receiving data from the database and for processing the data to provide output information indicative of remaining life prior to flaw or crack nucleation and residual life of engine components in the presence of the flaw or distortion, and an output interface for displaying the output information from the processor, indicative of the remaining life prior to flaw or crack nucleation, life consumed and residual life in the presence of the flaw in engine components.

2. The system according to claim 1, wherein the prognostics processor comprises a material engineering rule-based mission profile analyzer module, a combustor modeling module, an off-design engine analysis module, a thermodynamic modeling module, a non-linear finite element analysis module, and a material microstructure and internal state variable based deformation and fracture analysis module.

3. The system according to claim 2, wherein the output interface comprises life to distortion and probabilistic flaw or crack nucleation data, crack propagation data, surface condition data and remaining life data prior to flaw or crack nucleation, overhaul and inspection intervals data in the presence of flaws.

4. A computer implemented method for real-time assessment and prediction of remaining life prior to flaw nucleation and residual life in the presence of flaw or distortion of machine components, the method comprising the steps of:
  a) continuously monitoring variability of engine operating parameters and engine operating environment,
  b) performing usage and operating environment based flaw or crack nucleation, crack propagation, distortion, corrosion or erosion analysis for life consumption, remaining life prior to crack nucleation and residual life prediction in the presence of flaws of multiple structural components of a turbine engine, and
  c) predicting development of the intrinsic as well as extrinsic state of damage in these structural components before development of any discernable flaws, faults or damage in these components that may be manufactured out of metallic, ceramic or a combination of both types of materials using standard data acquired from engine monitoring interfaces.

5. The method according to claim 4, wherein the step a) comprises the substeps of
  i) collecting and analyzing the data points acquired by each monitoring interface,
  ii) performing materials engineering rule based mission profile analysis for assessing the types of thermal-mechanical loads and materials deformation and fracture accumulation modes and mechanisms selected from creep, fatigue, combined creep-fatigue environment interactions including variability in loads affecting damage accumulation rates the monitored components are subjected to during service.

6. The method according to claim 5, wherein the substep ii) comprises continuously computing variability of centrifugal loads and steady state homologous temperatures as well as cyclic homologous temperatures to establish the types of thermal-mechanical loads seen by the components using variability analysis, for each of the components monitored in real-time.

7. The method according to claim 6, further comprising removing artefacts using a modified rain-flow analysis technique in combination with homologous temperature plots to identify undesirable data points and to discern exact microstructure and internal state variable based damage and fracture modes and mechanisms that are operative as a function of turbine engine usage in real time.

8. The method according to claim 4, wherein the step b) comprises the substeps of
  i) performing combustor modeling to predict the variability in combustion liner temperatures and combustion nozzle plane temperature distributions as a function of turbine engine usage,
  ii) performing off-design engine modeling to determine variability in pitch-line temperatures in hot gas path components and thermodynamic modeling to compute variability in component temperature profiles of gas path as well as other rotating components for different stages of the engine as a function of actual turbine engine usage;
  iii) performing finite element (FE) based non-linear thermal-mechanical stress-strain analysis as a function of the variability in real time thermal-mechanical loads using an real-time FE solver and performing damage accumulation analysis using materials microstructure and internal state variable based damage and fracture models taking into account quantitative variability in microstructural parameters in a given row of gas path components or other rotating components in a fleet of engines, and
  iv) continuously providing an update of thermal-mechanical loads and quantifying the thermal-mechanical loads.

9. The method according to claim 8, wherein the substep i) comprises performing physics based combustor modeling for continuously obtaining the variability of combustor liner temperature and combustor nozzle plane temperature profiles as a function of turbine engine usage in real-time using a combustion solver or semi-empirical modeling techniques.

10. The method according to claim 8, wherein the substep ii) comprises continuously computing the variability of centrifugal loads and steady state homologous temperatures as well as cyclic homologous temperatures to establish the types of thermal-mechanical loads seen by the components using variability analysis, for each of the components monitored in real-time.

11. The method according to claim 10, further comprising physics based gas path modeling for continuously obtaining variability of pitch-line temperatures of different turbine engine gas path stages as a function of engine off-design usage conditions in real-time.

12. The method according to claim 10, further comprising physics based thermodynamic modeling including potential flow technique for continuously obtaining variability of two dimensional temperature profiles for different turbine engine gas path stages as a function of turbine engine usage conditions in real-time.

13. The method according to claim 10, further comprising a physics based heat transfer modeling for continuously obtaining variability of component temperature profiles for different turbine engine gas path stages including blades and vanes as a function of turbine engine usage conditions in real-time.

14. The method according to claim 10, further comprising a physics based heat transfer modeling for continuously obtaining variability of temperature profiles for different turbine engine stages for non-gas path components including discs, cooling plates and spacers as a function of turbine engine usage conditions in real-time.

15. The method according to claim 8, wherein the substep iii) comprises performing a non-linear finite element modeling for continuously obtaining variability of stress, strain and temperature profiles for different turbine engine components being monitored as a function of turbine engine usage conditions in real-time.

16. The method according to claim 4, wherein the step c) comprises the substeps of:
  i) updating and quantifying the damage accumulation rates using deformation physics and fracture processes operative in different components that allows accurate identification of fracture critical locations, estimation of remaining life prior to flaw or crack nucleation, life consumption and residual life of each component being monitored and fluctuations in specific component life parameters over time, and
  ii) continuously displaying the variability of fracture critical locations and remaining life prior to flaw or crack nucleation and residual life in the presence of flaws or distortion for each component monitored.

17. The method according to claim 16, wherein the substep i) comprises performing materials microstructure and internal state variable based damage and fracture modeling for continuously providing variability of distortion driven fracture critical locations, remaining life prior to flaw or crack nucleation, life consumption, residual life and inspection intervals in the presence of flaws for different turbine engine components being monitored as a function of turbine engine usage conditions in real-time.

18. The method according to claim 17, wherein substep i) further comprises performing physics based erosion, corrosion and hot corrosion damage modeling for continuously providing variability of surface degradation driven fracture critical locations, remaining life prior to flaw or crack nucleation, life consumption, residual life and inspection intervals in the presence of flaws for different turbine engine components being monitored as a function of turbine engine usage conditions in real-time.

19. The method according to claim 17, wherein substep i) further comprises performing material microstructure and internal state variable based high temperature creep, cold creep, low cycle fatigue, high cycle fatigue, corrosion fatigue, stress corrosion, thermal fatigue, thermal-mechanical fatigue, creep-fatigue environment interactions damage and fracture modeling for continuously computing variability of flaw or crack nucleation based fracture critical locations, remaining life prior to flaw or crack nucleation, and life consumption for different turbine engine components being monitored as a function of turbine engine usage conditions in real-time.

20. The method according to claim 17, wherein substep i) further comprises performing materials microstructure and internal state variable based creep, fatigue and combined creep-fatigue environment interaction fracture modeling for continuously computing variability of crack propagation based fracture critical locations, life consumption, residual life and safe inspection intervals in the presence of flaws for different turbine engine components being monitored as a function of turbine engine usage conditions in real-time.

* * * * *